United States Patent [19]

Szmuszkovicz

[11] 3,853,882
[45] Dec. 10, 1974

[54] 2,9-DIHYDRO-[C,F]-S-TRIAZOLO[4,3-A]AZEPIN-3-ONES

[75] Inventor: Jacob Szmuszkovicz, Kalamazoo, Mich.

[73] Assignee: The Upjohn Company, Kalamazoo, Mich.

[22] Filed: Aug. 7, 1973

[21] Appl. No.: 386,277

Related U.S. Application Data

[63] Continuation-in-part of Ser. No. 307,113, Nov. 16, 1972, abandoned, which is a continuation-in-part of Ser. No. 220,405, Jan. 24, 1972, abandoned.

[52] U.S. Cl. ............ 260/268 PC, 71/92, 260/239 D, 260/239.3 T, 260/247.1, 260/247.2 A, 260/293.59, 260/308 C, 424/248, 424/250, 424/267, 424/269
[51] Int. Cl. ....................... C07d 57/02, C07d 99/02
[58] Field of Search ...... 260/308 C, 268 PC, 293.59

[56] References Cited
UNITED STATES PATENTS

| | | | |
|---|---|---|---|
| 3,646,055 | 2/1972 | Hester | 260/308 C |
| 3,701,778 | 10/1972 | Van Der Burg | 260/268 PC |

*Primary Examiner*—Alton D. Rollins

[57] ABSTRACT

Compounds of the formula III:

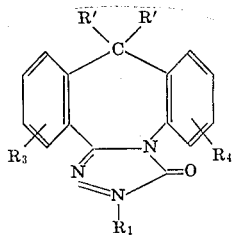

wherein R' is hydrogen or methyl; wherein $R_1$ is hydrogen, alkyl defined as above,

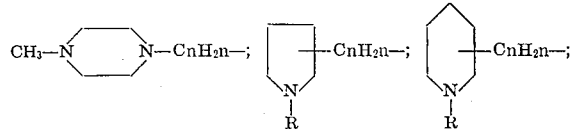

in which $n$ is 2 to 3 and R is alkyl of one to three carbon atoms, inclusive,

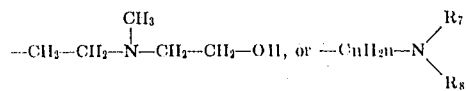

in which $R_7$ and $R_8$ are each selected from the group consisting of hydrogen and alkyl as defined above or

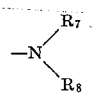

together is pyrrolidino and piperidino; and wherein $R_3$ and $R_4$ are hydrogen, fluoro, chloro, bromo, nitro, alkyl defined as above, trifluoromethyl, or alkoxy, of one to three carbon atoms, inclusive, are prepared by reacting a thio compound of formula I:

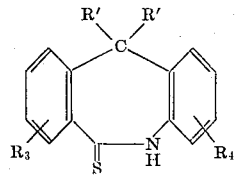

wherein R', $R_3$, and $R_4$ are defined as above, in sequence:

1. with an alkylcarbazate; and the resulting product II 2. with an alkylating agent of the formula $R'_1Cl$ or $R_1'Br$ in which $R_1'$ is defined as $R_1$ exclusive of hydrogen to obtain a compound III as defined above.

Compounds of formula II and III and the pharmacologically acceptable acid addition salts thereof have antidepressant activity and can be used in mammals.

26 Claims, No Drawings

2,9-DIHYDRO-[C,F]-S-TRIAZOLO[4,3-A]AZEPIN-3-ONES

CROSS REFERENCE TO RELATED APPLICATION

This application is a continuation-in-part of application Ser. No. 307,113, filed Nov. 16, 1972, and now abandoned which is a continuation-in-part of application Ser. No. 220,405, filed Jan. 24, 1972 and now abandoned.

BACKGROUND OF THE INVENTION

1. Field of the Invention

This invention is directed to new organic compounds and is particularly concerned with novel compounds II and III and a process for the production thereof.

The novel compounds and the process of production therefor can be illustratively represented as follows:

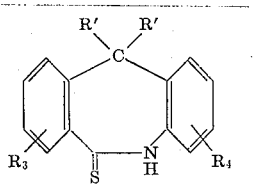

I

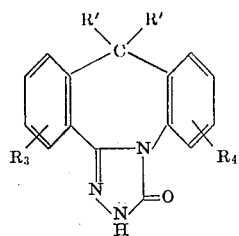

II

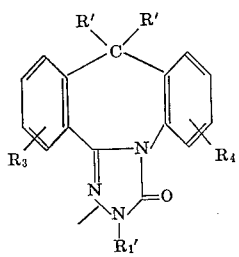

IIIA wherein R' is hydrogen or methyl; wherein R'$_1$ is alkyl of one to three carbon atoms, inclusive,

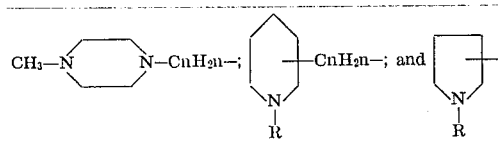

in which $n$ is 2 or 3, inclusive, and R is alkyl defined as above,

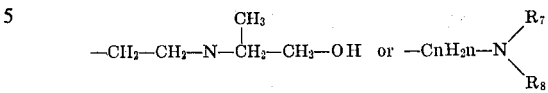

in which R$_7$ and R$_8$ are selected from the group consisting of hydrogen and alkyl as defined above and $n$ is defined as above; or together

is pyrrolidino, or piperidino, and wherein R$_3$ and R$_4$ are selected from the group consisting of hydrogen, fluoro, chloro, bromo, nitro, alkyl defined as above, trifluoromethyl, and alkoxy.

The invention also embraces the pharmacologically acceptable acid addition salts of the compounds of formula III above.

The more desirable products of this invention have the formula

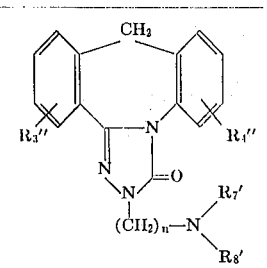

wherein $n$ is 2 or 3; wherein R$_7$' and R$_8$' are hydrogen or alkyl of one to three carbon atoms, inclusive; and wherein R$_3$' and R$_4$' are hydrogen, fluorine, chlorine, or bromine and the pharmacologically acceptable acid addition salts thereof.

The most desirable products have the formula

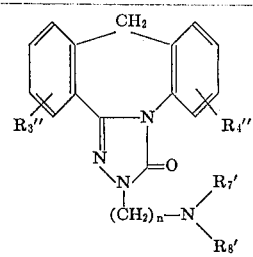

wherein $n$ is 2 or 3; wherein R$_7$' and R$_8$' are hydrogen or alkyl of one to three carbon atoms, inclusive; wherein R$_3$'' and R$_4$'' are hydrogen or chlorine and the pharmacologically acceptable acid addition salts thereof.

The process of this invention comprises heating a thio compound of formula I with an alkyl carbazate to obtain the triazolone compound II and alkylating II with a compound of formula ClR$_1$', BrR$_2$', or IR$_1$' in which R'₁ is defined as hereinabove, to produce a compound of formula IIIA above.

DESCRIPTION OF THE PREFERRED EMBODIMENT

Lower alkyl groups of one to three carbon atoms, inclusive, are exemplified by methyl, ethyl, propyl, and isopropyl.

The carbon chain moiety of alkoxy, which is of one to three carbon atoms, inclusive, can be defined as lower-alkyl of one to three carbon atoms, inclusive, as above.

The novel compounds of formula III (including compounds IIIA and IIIB) and pharmacologically acceptable acid addition salts thereof have antidepressant and tranquilizing activities and are thus useful for the treatment of depression and anxieties in mammals or birds.

The main function of an anti-depressant is to return the depressed individual to normal function. This should be carefully differentiated from psychic stimulants such as the amphetamines which produce over-stimulation in the normal individual.

Many different methods have been and are used to evaluate anti-depressant activity. In general these methods involve antagonism to a depressant such as reserpine or tetrabenazine or a synergistic increase of the toxicity of certain compounds (i.e., yohimbine or 3,4-dihydroxyphenylalanine) and comparison of the drug action of the new compound with other known anti-depressants. No single test alone can determine whether or not a new compound is an antidepressant or not, but the profile evidenced by various tests will establish the anti-depressant action is present. A number of such tests are described below.

Hypothermic tests with oxotremorine [1-[4-(pyrrolidinyl)-2-butynyl]-2-pyrrolidinone].

Oxotremorine (as well as apomorphine and tetrabenazine) produces hypothermic responses in mice. This response is blocked by anticholinergics and antidepressants such as atropine and imipramine.

Oxotremorine produces a very pronounced hypothermia which reaches a peak 60 minutes after administration.

At 0.6 mg./kg. the body temperature of a mouse is decreased about 13°F. (when the mouse is kept at room temperature). This temperature decrease is antagonized by anti-depressants, e.g., desipramine, imipramine, doxepine, and others as can be seen from Table I.

TABLE I

Effect of Various Compounds on Oxotremorine-Induced Hypothermia in Mice

| Compound | Dose mg./kg., I. P. | Absorption Time (min) | Body Temperature °F- Change From Vehicle Control After Minutes | | | |
|---|---|---|---|---|---|---|
| | | | 15 | 30 | 60 | 90 |
| oxotremorine (Control) | 0.6 | | −5.8 | −11.6 | −13.2 | −8.0 |
| Desipramine | 25 | 30 | −3.5 | −3.5 | −4.1 | −3.6 |
| Imipramine | 25 | 30 | −0.4 | −3.3 | −5.6 | −6.4 |
| Iprindole | 25 | 30 | −6.3 | −11.8 | −12.8 | −11.9 |
| Doxepine | 25 | 30 | −2.3 | −7.1 | −11.0 | −12.3 |
| Amitriptyline | 25 | 30 | +0.7 | −2.4 | −5.4 | −6.8 |
| Amphetamine | 5 | 30 | −1.5 | −4.3 | −4.4 | −2.2 |
| Atropine | 3 | 30 | +0.6 | −0.6 | −0.7 | −0.2 |

The present compounds were tested as follows. Four male mice of 18–22 g. (Strain CF = Carwork Farms) were injected intraperitoneally with 1 mg. of oxotremorine. The lowering of the body temperature was measured rectally with an electronic thermometer, before and 30 minutes after drug administration. After the drug administration the mice were kept at 19°C. in cages. An increase of 4°F. in the body temperature of the treated mouse (oxotremorine and test compound) over the control mouse (oxotremorine treated only) is indicative of antidepressive activity.

The results for the present compounds are tabulated below:

TABLE II

| | active at mg./kg. |
|---|---|
| Compound A | 12.5 |
| Compound B | 8.8 |
| Compound C | 12.5 |
| Compound D | 3.2 |

A = 2-[2-(dimethylamino)ethyl]-2,9-dihydro-3H-dibenzo-[3H-dibenzo-[c,f]-s-triazolo[4,3-a]azepin-3-one B = 2-[2-(dimethylamino)ethyl]-2,9-dihydro-3H-dibenzo-[b,f]-s-triazolo[4,3-a]azepin-3-one hydrochloride C = 2-aminoethyl-2,9-dihydro-3H-dibenzo[c,f]-s-trizolo-[4,3-a]azepin-3-one napsylate D = 2-[2-(methylamino)ethyl]-2,9-dihydro-3H-dibenzo-[c,f]-s-triazolo[4,3-a]azepin-3-one hydrochloride The same compounds were also tested for potentiation of yohimbine aggregation toxicity. The $LD_{50}$ of yohimbine hydrochloride in mice is 45 mg./kg. i.p. Administration of 30 mg./kg. of yohimbine hydrochloride is non-lethal. If an antidepressant is administered prior to the yohimbine hydrochloride (30 mg.) the lethality of the yohimbine hydrochloride is increased.

Ten male CF mice, 18–22 g., were injected with yohimbine hydrochloride in saline solution. After two hours the $LD_{50}$s are determined. Groups of ten mice are injected with the antidepressant 30 minutes before the administration of yohimbine hydrochloride [YC;] (30 mg.). No mice or only one mouse is killed from 30 mg. of [YCl]. If [YCl] is administered in the presence of an anti-depressant an increase in the toxicity of [YCl] is found. The $ED_{50}$ value of the four compounds A, B, C, and D in causing 50 percent of the mice to die, is shown in Table III:

TABLE III

| | $ED_{50}$ mg./kg. |
|---|---|
| [YCl] (30 mg.) control | no deaths |
| [YCl] (30 mg.) and A | 7.4 mg. (A) |
| [YCl] (30 mg.) and B | 7.4 mg. (B) |
| [YCl] (30 mg.) and C | 5.3 mg. (C) |
| [YCl] (30 mg.) and D | 4.4 mg. (D) |

Also the four compounds were tested for the potentiation of apomorphine gnawing. A group of 4 mice (male, CF, 18-22 g.) are administered the test compound intraperitoneally 1 hour prior to the subcutaneous injection of apomorphine hydrochloride 1 mg./kg. The mice are then placed in a plastic box (6 × 11 × 5 inches) lined at the bottom with a cellophane-backed, absorbent paper. The degree of damage to the paper at the end of 30 min. is scored from zero to 4. The scores 3 and 4 indicate that the compound is a potentiator of apomorphine in this test. All four compounds, A, B, C, and D were positive in this test at 100 mg./kg. in mice.

The test compound D showed the following activity in sedation and tranquilization tests:

Chimney test: [Med. Exp 4, 145 (1961)]: The effective intraperitoneal dosage for 50 percent of mice ($ED_{50}$) is 79 mg./kg. The test determines the ability of mice to back up and out of a vertical glass cylinder within 30 seconds. At the effective dosage, 50 percent of the mice failed doing it.

Dish test: Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of test compound at which 50 percent of the mice remain in the dish. The $ED_{50}$ (intraperitoneal administration) in this test was 2.5 mg./kg.

Pedestal test: The untreated mouse leaves the pedestal in less than a minute to climb back to the floor of the standard mouse box. Tranquilized mice will stay on the pedestal for more than 1 minute. The $ED_{50}$ (intraperitoneal administration) is 79 mg./kg.

Nicotine antagonism test: Mice in a group of 6 are injected with the test compound. Thirty minutes later the mice including control (untreated) mice are injected with nicotine salicylate (2 mg./kg.). The control mice show over-stimulation, i.e., (1) running convulsions followed by (2) tonic extensor fits; followed by (3) death. An intraperitoneal dosage of 5.6 mg./kg. of the test compound protected 50 percent of the mice against (2) and (3).

The test compounds B, C, and D have (by intraperitoneal injection) $ED_{50}$ as shown in the table below.

| Compound | $ED_{50}$ (in mg./kg.) | | | |
|---|---|---|---|---|
| | Ch | D | P | Ni |
| Compound B | 18 | 16 | 32 | 6 |
| Compound C | | | | 79 |
| Compound D | 45 | 63 | | 6.3 |

Ch = chimney test
D = dish test
P = pedestal test
Ni = nicotine antagonism (3) test Thus, the above results show that the compounds of formula III and the pharmacologically acceptable acid addition salts thereof can be used as anti-depressants and anti-anxiety drugs in mammals to achieve normalcy in the depressed or anxious individual.

The pharmaceutical forms of compounds of formula III and salts thereof contemplated by this invention include pharmaceutical compositions suited for oral, parenteral, and rectal use, e.g., tablets, powder packets, cachets, dragees, capsules, solutions, suspensions, sterile injectable forms, suppositories, bougies, and the like. Suitable diluents or carriers such as carbohydrates, lactose, proteins, lipids, calcium phosphate, cornstarch, stearic acid, methylcellulose and the like may be used as carriers or for coating purposes. Water or oils such as coconut oil, sesame oil, safflower oil, cottonseed oil, and peanut oil, may be used for preparing solutions or suspensions of the active drug. Sweetening, coloring and flavoring agents may be added.

For mammals food premixes with starch, oatmeal, dried fishmeat, fishmeal, flour, and the like can be prepared.

As antidepressants and antianxiety agents the compounds of formulae II and III, (including IIIA and IIIB) and their pharmacologically acceptable acid addition salts can be used in dosages of 1–50 mg./kg. and preferably in 1–15 mg./kg. in oral or injectable preparations, as described above, to alleviate depression and anxieties occurring in stressful situations. Such situations are those for example, when animals are in travel or changing ownerships or are temporarily put into kennels while their owners are absent from home. The larger mammals (10 kg. or more) respond best to the low dosages of the above dosage ranges.

Other acid addition salts of the compounds of formula III can be made, such as the fluosilicic acid addition salts which can be applied as mothproofing agents. The salts thereof with trichloroacetic acid are useful as herbicides against Johnson grass, Bermuda grass, yellow and red foxtail, and quack grass.

The starting materials of formula I of this invention are dihydrodibenzoazepinethiones which are either known or can be synthesized, for example, by treating the corresponding oxo compounds with phosphorus pentasulfide. This is further illustrated by the preparations.

Oxo compounds to make compounds of formula I have the formula

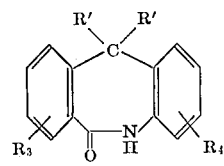

are shown with their respective syntheses by Schmutz et al., Helv. Chim. Acta 48, 336 (1965).

In carrying out the process of this invention, a selected thione I, is heated with an alkyl carbazate of the formula:

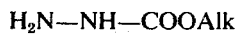

in which the alkyl group is of one to three carbon atoms, inclusive. Usually ethyl carbazate is preferred, but higher alkyl carbazates are operative. In the preferred embodiment of this invention, the selected thione I is heated with ethyl carbazate in large excess for ½ hour to 3 hours at 190° to 250°C. in an oil bath. The alkyl carbazate serves simultaneously as reagent and solvent. The product usually precipitates upon cooling of the reaction mixture and is recovered by filtration and purified by conventional means, e.g., extractions of impurities, chromatography or most commonly by recrystallization. The triazolone compound II is thus obtained.

Alkylation of II is achieved by reacting the product II with a strong base e.g., sodium or potassium hydride in an organic solvent, e.g., dimethylformamide, diethylformamide, diethylacetamide, tetrahydrofuran, dioxane, benzene or the like with an excess of the base, followed by reacting the alkali metal salt thus formed with $R_1'X$ in which X is chlorine, bromine, or iodine and $R_1'$ is defined as above. Both reactions, formation of salt and the reaction of this salt with $R_1'X$, are usually performed at elevated temperatures between 50° to 125°C. The conversion of II to its alkali salt is usually performed during 15–75 minutes. The reaction of the salt with the chloride is carried out during a longer period of time by keeping the reaction mixture at the elevated temperature for 1 to 36 hours. The product IIIA, thus obtained, is isolated and purified by conventional means, e.g., extraction, chromatography, crystallization and the like.

The following preparations and examples are illustrative of the processes and products of the present invention, but are not to be construed as limiting.

Preparation 1 6(5H)-morphanthridinethione

A mixture of 6(5H)-morphanthridinone (30 g., 0.144 mole), phosphorus pentasulfide (33.5 g., 0.158 mole) and 1200 ml. of pyridine is heated at reflux temperature for 23 hours and the pyridine was then evaporated. Methylene chloride and water are added, and the organic layer is separated (some solid was present), washed with aqueous sodium bicarbonate until only a trace of solid was present, then with saturated salt solution, dried over anhydrous magnesium sulfate and evaporated. Trituration of the residue with methanol gives 28.8 g. of 6(5H)-morphanthridinethione, of melting point 218°–219°C. Crystallization from methylene chloride-methanol gives the product as pale yellow rods; the melting point is unchanged.

Anal. calcd. for $C_{14}H_{11}N_2$:
C, 74.63; H, 4.92; N, 6.22; S, 14.23.
Found:
C, 74.94; H, 5.07; N, 6.08; S, 14.25.

Preparation 2 2-Chloro-6(5H)-morphanthridinethione

A mixture of 2-chloro-6(5H)-morphanthridinone (10 g.; 0.046 mole) phosphorous pentasulfide (11.2 g.) and 340 ml. of pyridine is refluxed 3 hours with 500 ml. of methylene chloride and 250 ml. of saturated aqueous sodium bicarbonate and filtered to give solid A. The organic layer of the filtrate was washed with aqueous sodium bicarbonate, saturated salt solution, dried and evaporated. The residue is combined with product A and crystallized from chloroform-methanol. Two crops of 2-chloro-6(5H)-morphanthridinethione are obtained: a first crop of 5.6 g. in the form of yellow needles of melting point 246°–257.5°C., and a second of 4.0 g. of melting point 245°–246°C.; total yield, 93%.

Anal. calcd. for $C_{14}H_{10}ClNS$:
C, 64.73; H, 3.88; Cl, 13.65; N, 5.39; S, 12.35.
Found:
C, 64.66; H, 3.83; Cl, 13.89; N, 5.38; S, 12.05.

In the same manner shown in preparations 1 and 2 are prepared 3-chloro-5(5H)-morphanthridinethione (melting point 258°–259.5°C.) 8-chloro-6(5H)-morphanthridinethione (melting point 236°–237°C.); 8-methyl-6(5H)-morphanthridinethione (melting point 194°–195°C.) from the correspondingly substituted 6-(5H)-morphanthridinones (Helv. Chim. Acta 48, 336, 1965). Other compounds, thus preparable, include:

4-chloro-6(5H)-morphanthridinethione;
3,8-dichloro-6(5H)-morphanthridinethione;
3,8-dibromo-6-(5H)-morphanthridinethione;
2,9-difluoro-6(5H)-morphanthridinethione;
8-chloro-6(5H)-morphanthridinethione;
9-methyl-6(5H)-morphanthridinethione;
1-fluoro-6(5H)-morphanthridinethione;
9-trifluoromethyl-6(5H)-morphanthridinethione;
2,8-diethoxy-6(5H)-morphanthridinethione;
3-isoprpoyl-6(5H)-morphanthridinethione;
6-chloro-6(5H)-morphanthridinethione;
7-fluoro-6(5H)-morphanthridinethione;
3-nitro-6(5H)-morphanthridinethione;
7-bromo-6(5H)-morphanthridinethione; and the like.

EXAMPLE 1

2,9-dihydro-3H-dibenzo[c,f]-s-triazolo[4,3-a]-azepin-3-one

A mixture of 6(5H)-morphanthridinethione (28.8 g., 0.128 mole) and ethyl carbazate (133 g., 1.28 mole) is heated in an oil bath preheated to 195°–205°C. using a takeoff condenser (45 ml. is removed). The resulting solid is mixed with methylene chloride-water and the suspension is filtered to give 12.6 g. of 2,9-dihydro-3H-dibenzo-[c,f]-s-triazolo[4,3-a]azepine-3-one melting at 276°–279°. The filtrate is separated into layers, and the organic layer is washed with water and saturated salt solution, and dried over anhydrous magnesium sulfate. About half of the solvent is removed by distillation and the solution is allowed to stand: 2.6 g. of product melting at 288°–290°C. separates. An additional crop of 3.3 g. melting at 285°–288°C. was also obtained. All crops of product are combined and crystallized from methylene chloride to yield 14.2 g. (44%) of 2,9-dihydro-3H-dibenzo[c,f]-s-triazolo[4,3-a]-azepin-3-one of melting point 289°–290°C., unchanged on recrystallization.

Anal. calcd. for $C_{15}H_{11}N_3O$:
C, 72.27; H, 4.45; N, 16.86.
Found:
C, 72.20; H, 4.30; N, 17.17.

EXAMPLE 2

2-[2-(Dimethylamino)ethyl]-2,9-dihydro-3H-dibenzo[c,f]-s-triazolo[4,3-a]azepin-3-one Sodium hydride (0.42 g., 0.01 mole of a 57 percent dispersion in mineral oil) is added to a solution of 2,9-dihydro-3H-dibenzo[c,f]-s-triazolo[4,3-a]azepin-3-one (2.49 g., 0.01 mole) in 100 ml. of dimethylformamide and the mixture is heated at 95°C. for 30 minutes. The mixture is cooled to 50°C. and a solution of dimethylaminoethyl chloride (1.07 g., 0.01 mole in 1.07 g. of xylene is added. The mixture is heated at 95°C. for 18 hours and evaporated. The residue is taken up in methylene chloride-water and extracted with methylene chloride. The extract is washed with saturated salt solution, dried over anhydrous magnesium sulfate and evaporated. Crystallization of the residue gives 2 g. of colorless prisms of 2-[2-(dimethylamino)ethyl]-2,9-dihydro-3H-dibenzo[c,f]-s-triazolo[4,3-a]-azepin-3-one, melting point 161°–162°C. which is unchanged on recrystallization of the product. A second crop of 200 mg. melting at 161°–162°C. was obtained.

Anal. calcd. for $C_{19}H_{20}N_4O$:
C, 71.22; H, 6.29; N, 17.49.
Found:
C, 71.20; H, 6.34; N, 17.33.

EXAMPLE 3

2-[3-(dimethylamino)propyl]-2,9-dihydro-3H-dibenzo[c,f]-s-triazolo[4,3-a]azepin-3-one Sodium hydride (0.178 g., 4.21 mmoles) in 50 ml. of dimethylformamide and the mixture is heated at 95°C. for 35 minutes. The mixture is cooled to 50°C., a solution of 3-dimethylaminopropyl chloride (0.51 g., 4.21 mmole in 0.51 g. of xylene) is added and heating was continued at 95°C. for 21 hours. The mixture is evaporated, methylene chloride-water is added to the residue. The organic layer is separated and extracted three times with 10 ml. portions of 10% aqueous hydrochloric acid. The acid extract is cooled, made alkaline with 15% aqueous sodium hydroxide and the basic mixture is extracted with methylene chloride. The extract is washed with saturated salt solution, dried oveor anhydrous magnesium sulfate and evaporated. Crystallization from ether of the residue gives 0.975 g. of 2-[3-(dimethylamino)propyl]-2,9-dihydro-3H-dibenzo[c,f]-s-triazolo[4,3-a]azepin-3-one of melting point 130°–131°C., unchanged on recrystallization.

Anal. calcd. for $C_{20}H_{22}N_4O$:
C, 71.83; H, 6.63; N, 16.76.
Found:
C, 71.91; H, 6.63; N, 17.16.

EXAMPLE 4

2-[3-(4-methyl-1-piperazinyl)propyl]-2,9-dihydro-3H-dibenzo[c,f]-s-triazolo[4,3-a]azepin-3-one and its dihydrochloride Sodium hydride (0.42 g., 0.01 mole of a 57 percent dispersion in mineral oil) is added to a solution of 2,9-dihydro-3H-dibenzo[c,f]-s-triazolo[4,3-a]azepin-3-one (2.49 g., 0.01 mole) in 100 ml. of dimethylformamide and the mixture is heated at 95°C. for 30 minutes. The mixture is cooled to about 50°C. A solution of 1-(3-chloropropyl)-4-methylpiperazine [prepared according to F. Sowinski and H. L. Yale, J. Med. Chem., 5, 54 (1962)] (1.76 g., 0.01 mole in 1.76 g. of xylene) is added and the mixture is heated at 95°C. for 21 hours. The mixture is evaporated and the resulting residue is dissolved in methylene chloride-water. The organic layer is separated and extracted with 10% aqueous hydrochloric acid. The acid extract is cooled, made alkaline with 15% aqueous sodium hydroxide and the basic mixture is extracted with methylene chloride. The extract is washed with saturated salt solution, dried over anhydrous magnesium sulfate and evaporated to give 2-[3-(4-methyl-1-piperazinyl)propyl]-2,9-dihydro-3H-dibenzo[c,f]-s-triazolo[4,3-a]azepin-3-one. The residue is dissolved in ether, treated with 100 ml. of 1 N hydrogen chloride in ethanol, and the resulting gum is crystallized from methanol-ether to give 2.9 g. of 2-[3-(4-methyl-1-piperazinyl)propyl]-2,9-dihydro-3H-dibenzo[c,f]-s-triazolo[4,3-a]azepin-3-one dihydrochloride partially hydrated, of melting point 277°–279°C., (dec.) raised to 279°–281°C. on recrystallization.

Anal. calcd. for $C_{23}H_{27}N_5O \cdot 2HCl \cdot \frac{1}{4}H_2O$:
C, 59.16; H, 6.37; N, 15.00; Cl, 15.19.
Found:
C, 59.17; H, 6.45; N, 15.14; Cl, 15.07.

The anhydrous product is obtained by drying the hydrate at 100°C. in vacuo for 72 hours.

Example 5

2,9-Dihydro-2-[2-[2-(hydroxyethyl)methylamino]-ethyl]-3H-dibenzo[c,f]-s-triazolo[4,3-a]azepin-3-one oxalate A stirred mixture of 2-[2-(methylamino)ethyl]-2,9-dihydro-3H-dibenzo[c,f]-s-triazolo[4,3-a]azepin-3-one (2.3 g.; 8.55 mmole), 2-bromoethanol (1.06 g.; 8.55 mmole) sodium carbonate (0.9 g.; 8.55 mmole) and 25 ml. of ethanol was refluxed for 20 hr. It was then cooled, filtered and filtrate evaporated. The residue (2.1 g.) is chromatographed on 210 g. of silica gel using 25% MeOH—$CHCl_3$ (50 ml. fractions were collected). Fractions 6–9 gave 1.5 g. which was dissolved in methanol and treated with a solution of 0.31 g. of oxalic acid in ether to give 1.1 g. of the 2,9-dihydro-2-[2-[2-(hydroxyethyl)methylamino]ethyl]-3H-dibromo[c,f]-s-triazolo[4,3-a]azepin-3-one oxalate, m.p. 214°–215° (efferv).

Anal. calcd. for $C_{20}H_{22}N_4O_2$:
C, 59.99; H, 5.99; N, 12.72.
Found:
C, 59.79; H, 5.66; N, 12.62.

EXAMPLE 6

12-chloro-2,9-dihydro-3H-dibenzo[c,f]-s-triazolo[4,3-a]azepine-3-one

In the manner given in Example 1, 8-chloro-6(5H)-morphanthridinethione and ethyl carbazate are reacted to give 12-chloro-2,9-dihydro-3H-dibenzo[c,f]-s-triazolo-[4,3-a]azepin-3-one of melting point 273.5°–275°C.

EXAMPLE 7

12-Chloro-2-[3-(dimethylamino)propyl]-2,9-dihydro-3H-dibenzo[c,f]-s-triazolo[4,3-a]azepine-3-one In the manner given in Example 2, 12-chloro-2,9-dihydro-3H-dibenzo[c,f]-s-triazolo[4,3-a]azepine-3-one is reacted with sodium hydride, 3-(dimethylamino)propyl chloride is added to give 12- chloro-2-[3-(dimethylamino)-propyl]-2,9-dihydro-3H-dibenzo[c,f]-s-triazolo[4,3-a]azepine-3-one.

EXAMPLE 8

12-methoxy-2,9-dihydro-3H-dibenzo[c,f]-s-triazolo[4,3-a]azepine-3-one

In the manner given in Example 1, 8-methoxy-6(5H)-morphanthridinethione and ethyl carbazate are reacted to give 12-methoxy-2,9-dihydro-3H-dibenzo[c,f]-s-triazolo-[4,3-a]azepine-3-one of melting point 227°–228°C.

EXAMPLE 9

12-methoxy-2-[3-(dimethylamino)propyl]-2,9-dihydro-3H-dibenzo[c,f]-s-triazolo[4,3-a]azepine-3-one hydrochloride hemihydrate In the manner given in Example 2, 12-methoxy-2,9-dihydro-3H-dibenzo[c,f]-s-triazolo[4,3-a]azepine-3-one is reacted with sodium hydride 3-(dimethylamino)propyl chloride is added and the mixture extracted with hydrochloric acid to give 12-methoxy-2-[3-dimethylaminopropyl]-2,9-dihydro-3H-dibenzo[c,f]-s-triazolo[4,3-a]azepine-3-one hydrochloride hemihydrate 146°–147°C.

In the same manner, but without hydrochloric acid extraction 12-methoxy-2-[2-(dimethylamino)ethyl)]-2,9-dihydro-3H-dibenzo[ c,f]-s-triazolo[4,3-a]azepine-3-one of melting point 99°–100°C. is prepared.

EXAMPLE 10

6,12-dichloro-2,9-dihydro-3H-dibenzo[c,f]-s-triazolo[4,3-a]azepin-3-one

In the manner given in Example 1, 3,8-dichloro-6(5H)-morphanthridinethione and ethyl carbazate give 6,12-dichloro-2,9-dihydro-3H-dibenzo[c,f]-s-triazolo[4,3-a]azepin-3-one.

EXAMPLE 11

6,12-dichloro-2-ethyl-2,9-dihydro-3H-dibenzo-[c,f]-s-triazolo[4,3-a]azepin-3-one In the manner given in Example 2, 6,12-dichloro-2,9-dihydro-3H-dibenzo[c,f]-s-triazolo[4,3-a]azepin-3-one when treated with sodium hydride and then with ethyl iodide gives 6,12-dichloro-2-ethyl-2,9-dihydro-3H-dibenzo[c,f]-s-triazolo[4,3-a]azepin-3-one.

EXAMPLE 12

7,11-Difluoro-2,9-dihydro-3H-dibenzo[c,f]-s-triazolo[4,3-a]azepin-3-one

In the manner given in Example 1, 2,9-difluoro-6(5H)-morphanthridinethione and ethyl carbazate give 7,11-difluoro-2,9-dihydro-3H-dibenzo[c,f]-s-triazolo[4,3-a]azepin-3-one.

EXAMPLE 13

7,11-difluoro-2,9-dihydro-2-[3-dipropylamino)-propyl]-3H-dibenzo[c,f]-s-triazolo[4,3-a]azepin-3-one In the manner given in Example 2, 7,11-difluoro-2,9-dihydro-3H-dibenzo[c,f]-s-triazolo[4,3-azepin-3-one, when treated with sodium hydride and then with 3-(dipropylamino)propyl chloride, gives 7,11-difluoro-2,9-dihydro-2-[3-(dipropylamino)propyl]-3H-dibenzo[c,f]-s-triazolo[4,3-a]-azepin-3-one.

EXAMPLE 14

12-chloro-2,9-dihydro-3H-dibenzo[c,f]-s-triazolo[4,3-a]azepin-3-one

In the manner given in Example 1, 8-chloro-6(5H)-morphanthridine and ethyl carbazate when reacted together gives 12-chloro-2,9-dihydro-3H-dibenzo[c,f]-s-triazolo-[4,3-a]azepin-3-one.

EXAMPLE 15

12-Chloro-2,9-dihydro-2-[2-(1-pyrrolidinyl)-ethyl]-3H-dibenzo[c,f]-s-triazolo[4,3-a]azepin-3-one In the manner given in Example 2, 12-chloro-2,9-dihydro-3H-dibenzo[c,f]-s-triazolo[4,3-a]azepin-3-one when treated with sodium hydride and then with 1-(2-chloroethyl)pyrrolidine gives 12-chloro-2,9-dihydro-2-[2-(1-pyrrolidinyl)ethyl]-3H-dibenzo[c,f]-s-triazolo[4,3-a]azepin-3-one.

EXAMPLE 16

8-fluoro-2,9-dihydro-13-propyl-3H-dibenzo-[c,f]-s-triazolo[4,3-a]azepin-3-one

In the manner given in Example 1, 1-fluoro-7-propyl-6(5H)morphanthridinethione and propyl carbazate give 8-fluoro-2,9-dihydro-13-propyl-3H-dibenzo[c,f]-s-triazolo-[4,3-a]azepin-3-one.

EXAMPLE 17

5-Ethyl-13-bromo-2,9-dihydro-3H-dibenzo[c,f]-s-triazolo[4,3-a]azepin-3-one

In the manner given in Example 1, 4-ethyl-7-(bromo)-6(5H)-morphanthridinethione and ethyl carbazate when reacted together, give 5-ethyl-13-bromo-2,9-dihydro-3H-dibenzo[c,f]-s-triazolo[4,3-a]azepin-3-one.

EXAMPLE 18

5-methyl-13-(chloro)-2,9-dihydro-2-propyl-3H-dibenzo[c,f]-s-triazolo[4,3-a]azepin-3-one In the manner given in Example 2, 5-methyl-13-(chloro)- 2,9-dihydro-3H-dibenzo[c,f]-s-triazolo[4,3-a]azepin-3-one is treated with sodium hydride and then with propyl iodide to give 5-methyl-13-chloro-2,9-dihydro-2-propyl-3H-dibenzo-[c,f]-s-triazolo[4,3-a]azepin-3-one.

EXAMPLE 19

2-[2-(dimethylamino)ethyl]-2,9-dihydro-3H-dibenzo[c,f]-s-triazolo[4,3-a]azepin-3-one hydrochloride A solution of 2-[2-(dimethylamino)ethyl]-2,9-dihydro-3H-dibenzo[c,f]-s-triazolo[4,3-a]azepine-3-one (1.2 g.) in ether was treated with etheral hydrogen chloride. Crystallization of the thus obtained salt from ethanol-ether gave 1.1 g. of novel 2-[2-(dimethylamino)ethyl]-2,9-dihydro-3H-dibenzo[c,f]-s-triazolo[4,3-a]azepin-3-one hydrochloride of melting point 252°–253.5°C.

Anal. calcd. for $C_{19}H_{20}N_4O \cdot HCl$:
C, 63.95; H, 5.94; N, 15.70; Cl, 9.93.
Found:
C, 63.90; H, 5.98; N, 15.92; Cl, 10.07.

EXAMPLE 20
7-Chloro-2,9-dihydro-3H-dibenzo[c,f]-s-triazolo[4,3-a]azepin-3-one A mixture of 2-chloro-6(5H)-morphanthridinethione (2.6 g., 0.01 mole) and ethyl carbazate (10.4 g., 0.1 mole) is immersed for 50 minutes at 220°–227°C. in an oil bath which has been preheated to that temperature. During this time 4 ml. of liquid is collected via a takeoff condenser. The product is a glassy solid which was ground, and to it water and chloroform are added. The mixture is extracted several times with water, and saturated salt solution, dried over anhydrous magnesium sulfate and evaporated to dryness. Crystallization from methanol of the residue gives a first crop of 1.2 g. of 7-chloro-2,9-dihydro-3H-dibenzo[c,f]-s-triazolo[4,3-a]azepin-3-one in the form of pale yellow needles which melt at 272°–273°C. (unchanged on recrystallization). A second crop of product weighs 0.45 g. and melts at 267°–269°C.; yield, 59%.

Anal. calcd. for $C_{15}H_{10}ClN_3O$:
C, 63.50; H, 3.55; Cl, 12.50; N, 14.81.
Found:
C, 62.99; H, 3.49; Cl, 12.42; N, 14.78.

EXAMPLE 21
2,9-Dihydro-2-[2-(1-methyl-2-pyrrolidinyl)-ethyl]-3H-dibenzo[c,f]-s-triazolo[4,3-a]azepin-3-one In the manner given in Example 2, 2,9-dihydro-3H-dibenzo[c,f]-s-triazolo[4,3-a]azepin-3-one is treated with sodium hydride and thereafter with 2-(1-methyl-2-pyrrolidinyl)-ethyl chloride to give 2,9-dihydro-2-[2-(1-methyl-2-pyrrolidinyl)ethyl]-3H-dibenzo[c,f]-s-triazolo[4,3-a]azepin-3-one.

EXAMPLE 22
7-Chloro-2-[2-dimethylamino)ethyl]-2,9-dihydro-3H-dibenzo[c,f]-s-triazolo[4,3-a]azepin-3-one Sodium hydride (0.188 g., 4.47 mmoles of a 57 percent dispersion in mineral oil) is added to a solution of 7-chloro-2,9-dihydro-3H-dibenzo[c,f]-s-triazolo[4,3-a]azepine-3-one (1.25 g., 4.47 mmoles) in 50 ml. of dimethylformamide and the mixture is heated at 95°C. for 25 minutes. The mixture is then cooled, a solution of 2-dimethylaminoethyl chloride (0.48 g., 4.47 mmole) in 0.48 g. of xylene is added and the mixture is continually heated at 95°C. for 16.5 hours. The product is isolated according to the procedure of Example 2. Crystallization from ether gives 0.92 g. of 7-chloro-2-[2-(dimethylamino)ethyl]-2,9-dihydro-3H-dibenzo[c,f]-s-triazolo[4,3-a]azepin-3-one melting at 152°–153°C. (unchanged on recrystallization).

Anal. calcd. for $C_{19}H_{19}ClN_4O$:
C, 64.31; H, 5.41; Cl, 9.99; N, 15.79.
Found:
C, 64.17; H 5.49; Cl, 9.99; N, 15.37.

EXAMPLE 23
2,9-Dihydro-2-[3-(1-piperidinyl)propyl]-3H-dibenzo[c,f]-s-triazolo[4,3-a]azepin-3-one In the manner given in Example 2, 2,9-dihydro-3H-dibenzo[c,f]-s-triazolo[4,3-a]azepine-3-one is treated with sodium hydride and the resulting product is treated with 1-(3-chloropropyl)piperidine to give 2,9-dihydro-2-[3-(1-piperidinyl)propyl]-3H-dibenzo[c,f]-s-triazolo-[4,3-a]azepin-3-one.

EXAMPLE 25
2,9-Dihydro-2-[2-(1-methyl-2-pyrrolidinyl)propyl]-3H-dibenzo[c,f]-s-triazolo[4,3-a]azepin-3-one Two grams (0.00805 mole) of 2,9-dihydro-3H-dibenzo-[c,f]-s-triazolo[4,3-a]azepin-3-one is treated with 195 mg. of sodium hydride in dimethylformamide and thereupon with 1.18 g. of 2-(3-chloropropyl)-1-methylpyrrolidine to give 1.7 g. of 2,9-dihydro-2-[2-(1-methyl-2-pyrrolidinyl)-propyl]-3H-dibenzo[c,f]-s-triazolo[4,3-a]azepin-3-one as an amorphous solid.

EXAMPLE 26
2-[2-(Diethylamino)ethyl]-2,9-dihydro-3H-dibenzo[c,f]-s-triazolo[4,3-a]azepin-3-one and maleate thereof In the manner given in Example 2, 2,9-dihydro-3H-dibenzo[c,f]-s-triazolo[4,3-a]azepin-3-one is treated with sodium hydride and then with diethylaminomethyl chloride to give 2-[2-(diethylamino)ethyl]-2,9-dihydro-3H-dibenzo[c,f]-s-triazolo[4,3-a]azepin-3-one as a yellow oil.

This product is converted with maleic acid in ether to 2-[2-(diethylamino)ethyl]-2,9-dihydro-3H-dibenzo[c,f]-s-triazolo[4,3-a]azepin-3-one maleate of melting point 147°–148° C.

Anal. calcd. for $C_{21}H_{24}N_4O \cdot C_4H_4O_4$:
C, 64.64; H, 6.08; N, 12.06.
Found:
C, 64.58; H, 6.01; N, 12.10.

EXAMPLE 27
2,9-Dihydro-2-[2-(1-piperidinyl)ethyl]-3H-dibenzo[c,f]-s-triazolo[4,3-a]azepin-3-one hydrochloride In the manner given in Example 1, 2,9-dihydro-3H-dibenzo[c,f]-s-triazolo[4,3-a]azepin-3-one is treated with sodium hydride and 1-(2-chloroethyl)piperidine to give after extraction with hydrochloric acid 2,9-dihydro-2-[2-(1-piperidinyl)ethyl]-3H-dibenzo[c,f]-s-triazolo-[4,3-a]azepin-3-one hydrochloride of melting point 247°–248.5° C.

EXAMPLE 28
2,9-Dihydro-2-[2-(methylamino)ethyl]-3H-dibenzo[c,f]-s-triazolo[4,3-a]azepin-3-one A solution of 2,9-dihydro-2-[2-(dimethylamino)ethyl]-3H-dibenzo[c,f]-s-triazolo[4,3-a]azepin-3-one in benzene and chloroform is heated with ethyl chloroformate at reflux temperature for 12 hours to give 2-[2-[(ethoxycarbonyl)methylamino]ethyl]-2,9-dihydro-3H-dibenzo[c,f]-s-triazolo[4,3-a]azepin-3-one.

This product in propylene glycol containing potassium hydroxide is kept at reflux temperature for 3 hours to give 2-[2-(methylamino)ethyl]-2,9-dihydro-3H-dibenzo[c,f]-s-triazolo[4,3-a]azepin-3-one of melting point 125°–126° C.

The hydrochloride of 2,9-dihydro-2-[2-(methylamino)ethyl]-3H-dibenzo[c,f]-s-triazolo[4,3a]azepine-3-one is prepared by mixing the base with anhydrous hydrogen chloride in ether: melting point 257°–259° C.

EXAMPLE 29

2-[(1-methylpiperidinyl-2-yl)methyl]-2,9-dihydro-3H-dibenzo[c,f]-s-triazolo[4,3-a]azepin-3-one hydrochloride In the manner given in Example 2, 2,9-dihydro-3H-dibenzo[c,f]-s-triazolo[4,3-a]azepin-3-one, sodium hydride and 1-methyl-2-chloromethylpiperidine gives after extraction with hydrochloric acid 2-[(1-methylpiperidinyl-2-yl)-methyl]-2,9-dihydro-3H-dibenzo[c,f]-s-triazolo[4,3-a]azepin-3-one hydrochloride of melting point 150°–151° C.

EXAMPLE 30

2-[2-(phthalimido)ethyl]-2,9-dihydro-3H-dibenzo[c,f]-s-triazolo[4,3-a]azepine-3-one Sodium hydride (0.421 g.; 0.01 mole of 57 percent dispersion in mineral oil) is added to a solution of 2,9-dihydro-3H-dibenzo[c,f]-s-triazolo[4,3-a]azepine-3-one (2.49 g.; 0.01 mole) in 50 ml. of dimethylformamide and the mixture is heated for 40 minutes at 95° C. A solution of N-(2-bromoethyl)phthalimide (2.54 g.; 0.01 mole) in 15 ml. of dimethylformamide is then added during 2 minutes and the mixture is heated at 95° C. for 17 hours. It is evaporated, 50 ml. of water is added and the resulting suspension is filtered. The resulting solid is crystallized from methanol to give 2.8 g. of 2-[2-(phthalimido)ethyl]-2,9-dihydro-3H-dibenzo[c,f]-s-triazolo[4,3-a]azepine-3-one of melting point 184°–185° C. raised to 186°–187° on recrystallization.

Anal. calcd. for $C_{25}H_{18}N_4O_3$:
C, 71.08; H, 4.29; N, 13.26.
Found:
C, 71.10; H, 4.29; N, 13.13.

EXAMPLE 31

2-[2-(amino)ethyl]-2,9-dihydro-3H-dibenzo[c,f]-s-triazolo[4,3-a]azepine-3-one and its napsylate acid addition salt) is prepared in methanol and recrystallized as napsylate from methanol, melting point 281.5°–283°.

EXAMPLE 32

2-[1-[(N-benzyl-N-methylamino)ethyl]-2,9-dihydro-3H-dibenzo[c,f]-s-triazolo[4,3-a]azepine-3-one hydrochloride In the manner given in Example 2, 2,9-dihydro-3H-dibenzo[c,f]-s-triazolo[4,3-a]azepine-3-one, when treated with sodium hydride and then with 2-(benzylmethylamino)ethyl chloride gives 2-[2-(N-benzyl-N-methylamino)ethyl]-2,9-dihydro-3H-dibenzo[c,f]-s-triazolo[4,3-a]azepine-3-one of melting point 98°–99.5° C. Hydrogenation of this compound by the usual procedure results in 2,9-dihydro-2-[2-(methylamino)ethyl]-3H-dibenzo[c,f]-s-triazolo[4,3-a]azepin-3-one, melting point 251°–259° C.

EXAMPLE 33

6-Chloro-2,9-dihydro-3H-dibenzo[c,f]-s-triazolo[4,3-a]azepin-3-one

A mixture of 3-chloro-6-(5H)-morphanthridinethione (26.5 g., 0.103 mole) and ethyl carbazate (107 g., 1.03 mole) is immersed for 120 minutes at 210°–215° C. in an oil bath which has been preheated to that temperature. During this time 45 ml. of liquid is collected via a take-off condenser. The product is a solid which is ground, and to it water and chloroform are added. The mixture is extracted several times with chloroform. The extracts are combined, washed with water, and saturated salt solution, dried over anhydrous magnesium sulfate and evaporated to dryness. Crystallization from methanol-chloroform of the residue gives 9.5 g. of 6-chloro-2,9-dihydro-3H-dibenzo[c,f]-s-triazolo[4,3-a]azepin-3-one which melts at 266°–267° C. (unchanged on recrystallization). The second crop is 3.65 g. of melting point 265°–266° C.

Anal. calcd. for $C_{15}H_{10}ClN_3O$:
C, 63.50; H, 3.55; Cl, 12.50; N, 14.81.
Found:
C, 63.43; H, 3.70; Cl, 12.80; N, 14.79.

EXAMPLE 34

6-Chloro-2-[2-(dimethylamino)ethyl]-2,9-dihydro-3H-dibenzo[c,f]-s-triazolo[4,3-a]azepin-3-one Sodium hydride (0.97 g., 23 mmoles of a 57 percent dispersion in mineral oil) is added to a solution of 6-chloro-2,9-dihydro-3H-dibenzo[c,f]-s-triazolo[4,3-a]azepine-3-one (6.5 g., 23 mmoles) in 230 ml. of dimethylformamide and the mixture is heated at 95° C. for 40 minutes. After reacting with dimethylaminoethyl chloride the product is isolated according to the procedure of Example 2. Crystallization from ether gives 6-chloro-2-[2-(dimethylamino)-ethyl]-2,9-dihydro-3H-dibenzo[c,f]-s-triazolo[4,3-a]azepine-3-one of melting point 158.5°–160° C.

Anal. calcd. for $C_{19}H_{19}N_4O$:
C, 64.31; H, 5.40; Cl, 9.99; N, 15.79.
Found:
C, 64.39; H, 5.40; Cl, 9.85; N, 16.20.

EXAMPLE 35

2,9-Dihydro-9,9-dimethyl-3H-dibenzo[c,f]-s-triazolo[4,3-a]azepin-3-one

A. 6-Chloro-11,11-dimethylmorphanthridine

A melt of 11,11-dimethyl-6(5H)-morphanthridinone (4.72 g.; 0.02 mole) with phosphorus pentachloride (5.8 g.; 0.028 mole) was stirred under nitrogen at 130° C., for 2 hours. The phosphorus oxytrichloride which had formed was distilled off under reduced pressure leaving a red viscous oil (5.1 g.). This oil was crystallized and used in the next preparation without further purification.

B. 11-11-Dimethylmorphanthridine-N-carbethoxyhydrazide

6-Chloro-11,11-dimethylmorphanthridine (5.1 g.; 0.02 mole) prepared as above and ethyl carbazate (10.4 g.; 0.1 mole) in 200 ml. of absolute ethanol is refluxed under nitrogen for 21 hours and then evaporated to dryness in vacuo. The residue is dissolved in 100 ml. of methylene chloride and washed with 2% cold aqueous sodium hydroxide then with water and evaporated in vacuo to give 6.1 g. of 11,11-dimethylmorphanthridine-N-carbethoxy-hydrazide which is used in the next step without further purification.

B. 11,11-Dimethylmorphanthridine-N-carbethoxyhydrazide

6-Chloro-11,11-dimethylmorphanthridine (5.1 g.; 0.02 mole) in 200 ml. of absolute ethanol is refluxed under nitrogen for 21 hours and then evaporated to dryness in vacuo. The residue is dissolved in 100 ml. of methylene chloride and washed with 2% cold aqueous sodium hydroxide then with water and evaporated in vacuo to give 6.1 g. of 11,11-dimethylmorphanthridine-N-carbethoxy-hydrazide which is used in the next step without further purification.

C. 2,9-Dihydro-9,9-dimethyl-3H-dibenzo[c,f]-s-triazolo-[4,3-a]azepin-3-one 11,11-Dimethylmorphanthridine-N-carbethoxyhydrazide (6.4 g.; 0.02 mole) prepared above in 100 ml. of n-butanol is refluxed under nitrogen for 24 hours. The solvent is evaporated in vacuo to leave an oil which is dissolved in 40 ml. of $CHCl_3$, washed with cold 5% NaOH, $H_2O$, and concentrated to a viscous, colorless syrup. This is crystallized using acetone to give 1.53 g. of 2,9-dihydro-9,9-dimethyl-3H-dibenzo[c,f]-s-triazolo[4,3-a]azepin-3-one as white needles of melting point 311°–314° C.

Anal. calcd. for $C_{17}H_{15}N_3O$:
C, 73.63; H, 5.45; N, 15.15.
Found:
C, 73.14; H, 5.43; N, 14.89.

EXAMPLE 36

2,9-Dihydro-2-[2-(dimethylamino)ethyl]-9,9-dimethyl-3H-dibenzo[c,f]-s-triazolo[4,3a]azepin-3-one A mixture of 2,9-dihydro-9,9-dimethyl-3H-dibenzo-[c,f]-s-triazolo[4,3-a]azepin-3-one (1.38 g.; 0.005 mole) and sodium hydride in mineral oil (50%, 250 mg.; 0.006 mole) in 50 ml. N,N-dimethylformamide is heated under $N_2$ at 95° C. for 40 minutes. To this was added dimethylaminoethyl chloride (0.01 mole) in benzene and stirring and heating were continued for 7 hours. The N,N-dimethylformamide is removed in vacuo to give a syrup which is dissolved in 50 ml. of methylene chloride and water. The organic layer is extracted with cold 10% hydrochloric acid and the acid solution is basified and extracted with methylene chloride. Evaporation of the solvent gave a residue which was crystallized from methylene chloride-Skellysolve B hexanes to give 6.50 mg. of 2,9-dihydro-2-[2-(dimethylamino)ethyl]-9,9-dimethyl-3H-dibenzo[c,f]-s-triazolo[4,3-a]azepin-3-one of melting point 148°–149° C.

Anal. calcd. for $C_{21}H_{24}N_4O$:
C, 72.38; H, 6.94; N, 16.08.
Found:
C, 72.42; H, 6.97; N, 16.38.

EXAMPLE 37

6-Chloro-2-[3-(dimethylamino)propyl]-2,9-dihydro-3H-dibenzo[c,f]-s-triazolo[4,3-a]azepin-3-one and its oxalate In the manner given in Example 2, 6-chloro-2,9-dihydro-3H-dibenzo[c,f]-s-triazolo[4,3-a]azepin-3-one is treated with sodium hydride and thereafter with 3-(dimethylamino)-propyl chloride to give 6-chloro-2-[3-(dimethylamino)propyl]-2,9-dihydro-3H-dibenzo[c,f]-s-triazolo[4,3-a]azepin-3-one as an oil. The oxalate salt was prepared with oxalic acid in ether and had a melting point of 235°–236° C.

EXAMPLE 38

2-[2-(4-methyl-1-piperazinyl)ethyl]-3H-dibenzo[c,f]-s-triazolo[4,3-a]azepin-3-one and its dihydrochloride In the manner given in Example 2, 2,9-dihydro-3H-dibenzo[c,f]-s-triazolo[4,3-a]azepin-3-one is treated with sodium hydride and thereafter with 1-(2-chloroethyl)-4-methylpiperazine to give 2-[2-(4-methyl-1-piperazinyl)ethyl]-3H-dibenzo[c,f]-s-triazolo[4,3-a]azepin-3-one as an oil. The oil was dissolved in ether and treated with ethereal hydrogen chloride to give the dihydrochloride as a hydrate of melting point 245° C. The anhydrous salt can be obtained by vaccum drying.

In the manner illustrated in the preceding examples other thiones of formula I can be converted with an alkyl carbazate such as methyl, ethyl, propyl, or isopropyl carbazate to an azepine of formula II. Representative compounds of formula II, thus obtained, include:

6,12-dibromo-2,9-dihydro-3H-dibenzo[c,f]-s-triazolo[4,3-a]-azepin-3-one;
6-Chloro-12-bromo-2,9-dihydro-3H-dibenzo[c,f]-s-triazolo-[4,3-a]azepine-3-one;
13-methyl-2,9-dihydro-5-(methylthio)-3H-dibenzo[c,f]-s-triazolo[4,3-a]azepin-3-one;
2,9-dihydro-5-isopropyl-10-iodo-3H-dibenzo[c,f]-s-triazolo[4,3-a]azepin-3-one;
6,11-diethoxy-2,9-dihydro-3H-dibenzo[c,f]-s-triazolo-[4,3-a]azepin-3-one;
7,12-diisopropoxy-2,9-dihydro-3H-dibenzo[c,f]-s-triazolo-[4,3-a]azepin-3-one;
13-bromo-2,9-dihydro-6-isopropyl-3H-dibenzo[c,f]-s-triazolo[4,3-a]azepin-3-one;
12-Chloro-2,9-dihydro-3H-dibenzo[c,f]-s-triazolo[4,3-a]azepin-3-one;
5-fluoro-2,9-dihydro-3H-dibenzo[c,f]-s-triazolo[4,3-a]azepin-3-one;
12-Trifluoromethyl-2,9-dihydro-3H-dibenzo[c,f]-s-triazolo-[4,3-a]azepin-3-one;
2,9-dihydro-11-iodo-3H-dibenzo[c,f]-s-triazolo[4,3-a]azepin-3-one;
11-bromo-2,9-dihydro-3H-dibenzo[c,f]-s-triazolo[4,3-a]azepin-3-one;
12-bromo-6-fluoro-2,9-dihydro-3H-dibenzo[c,f]-s-triazolo[4,3-a]azepin-3-one;
6,12-dichloro-9,9-dimethyl-2,9-dihydro-3H-dibenzo[c,f]-s-triazolo[4,3-a]azepin-3-one;
5-nitro-9,9-diethyl-2,9-dihydro-3H-dibenzo[c,f]-s-triazolo-[4,3-a]azepin-3-one;
2,9-dihydro-9-methyl-3H-dibenzo[c,f]-s-triazolo[4,3-a]azepin-3-one;
2,9-dihydro-9-propyl-3H-dibenzo[c,f]-s-triazolo[4,3-a]azepin-3-one;
and the like.

Treating these compounds of formula II with a strong base e.g. sodium hydride, potassium hydride, sodium butoxide, potassium isopropoxide followed by a halogenated compound of formula $R_1'X$ wherein $R_1'$ is defined as herein above, and X is halogen selected from chlorine, bromine, or iodine gives the corresponding compounds of formula III. Representative compounds, thus obtained, include:

6,12-dibromo-2-[3-(diethylamino)propyl]-2,9-dihydro-3H-dibenzo[c,f]-s-triazolo[4,3-a]azepin-3-one;

6-amino-12-bromo-2-(2-morpholinoethyl)-2,9-dihydro-3H-dibenzo[c,f]-s-triazolo[4,3-a]azepin-3-one;

2-[3-(dimethylamino)propyl]-2,9-dihydro-13-methyl-5-methyl-3H-dibenzo[c,f]-s-triazolo[4,3-a]azepine-3-one;

2-[3-(dipropylamino)propyl]-2,9-dihydro-5-isopropyl-10-ethyl-3H-dibenzo[c,f]-s-triazolo[4,3-a]azepin-3-one;

6,11-diethoxy-2-[3-(diethylamino)propyl]-2,9-dihydro-3H-dibenzo[c,f]-s-triazolo[4,3-azepin-3-one;

7,12-diisopropoxy-2-[2-(dimethylamino)ethyl]-2,9-dihydro-3H-dibenzo[c,f]-s-triazolo[4,3-a]azepin-3-one;

13-nitro-2-[2-(diethylamino)ethyl]-2,9-dihydro-6-isopropyl-3H-dibenzo[c,f]-s-triazolo[4,3-a]azepin-3-one;

12-trifluoromethyl-2,9-dihydro-2-[3-(1-pyrrolidinyl)propyl]-3H-dibenzo[c,f]-s-triazolo[4,3-a]azepin-3-one;

5-fluoro-2,9-dihydro-2-[2-(1-piperidinyl)ethyl]-3H-dibenzo-[c,f]-s-triazolo[4,3-a]azepin-3-one;

12-nitro-2-[2-(4-methyl-1-piperazinyl)ethyl]-2,9-dihydro-3H-dibenzo[c,f]-s-triazolo[4,3-a]azepin-3-one;

2,9-dihydro-11-propyl-2-[2-[2-(1-methyl-2-piperidinyl)]-ethyl]-3H-dibenzo[c,f]-s-triazolo[4,3-a]azepin-3-one;

12-bromo-6-fluoro-2,9-dihydro-2-(2-morpholinoethyl)-3H-dibenzo[c,f]-s-triazolo[4,3-a]azepin-3-one;

6,12-dichloro-2-[3-(diethylamino)propyl]-9,9-dimethyl-2,9-dihydro-3H-dibenzo[c,f]-s-triazolo[4,3-a]azepin-3-one;

5-amino-9,9-diethyl-2-[2-(dimethylamino)ethyl]-2,9-dihydro-3H-dibenzo[c,f]-s-triazolo[4,3-a]azepin-3-one;

and the like.

Treatment of the compounds of formula III with a pharmacologically acceptable acid such as hydrochloric, hydrobromic, phosphoric, sulfuric, acetic, propionic, toluenesulfonic, naphthalene-β-sulfonic, methanesulfonic, tartaric, citric, lactic, malic, maleic, or cyclohexanesulfamic (acids) produces the pharmacologically acceptable salts of these compounds of formula III. The salts can be used for the same purposes as the free base compounds of formula III.

Salt formation is achieved in conventional manner by reacting the compounds of formula III with an excess of a selected acid in a suitable medium e.g. water, alkanol, ether, or acetone and recovering the salt by evaporating the solvent, preferably in vacuo.

I claim:

1. A compound selected from the group consisting of 2,9-dihydro[c,f]-s-triazolo[4,3-a]azepin-3-ones of the formula III:

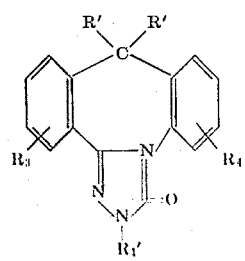

wherein R' is hydrogen or methyl; wherein $R_1$ is hydrogen, alkyl of one to three carbon atoms, inclusive,

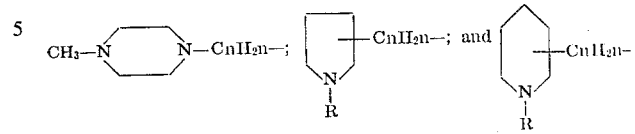

in which $n$ is 2 or 3, inclusive, and R is alkyl defined as above, or $R_1$ is

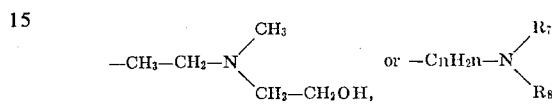

in which $R_7$ and $R_8$ are hydrogen or alkyl defined as above and $n$ is defined as above, or together

is pyrrolidino or piperidino; and wherein $R_3$ and $R_4$ are each selected from the group consisting of hydrogen, fluoro, chloro, bromo, nitro, alkyl defined as above, trifluoromethyl, and alkoxy, of one to three carbon atoms, inclusive, and the pharmacologically acceptable acid addition salts thereof.

2. A compound according to claim 1 of the formula:

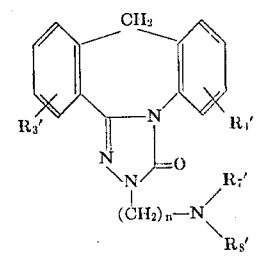

wherein $n$ is 2 or 3, wherein $R_7'$ and $R_8'$ are hydrogen or alkyl of one to three carbon atoms, inclusive; and wherein $R_3'$ and $R_4'$ are hydrogen, fluorine, chlorine, or bromine and the pharmaceutically acceptable acid addition salts thereof.

3. A compound according to claim 1 of the formula:

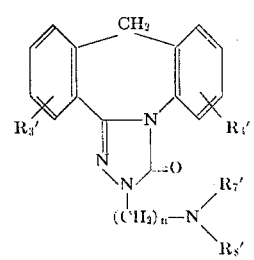

wherein $n$ is 2 or 3; wherein $R_7'$ and $R_8'$ are hydrogen or alkyl of one to three carbon atoms, inclusive; wherein $R_3''$ and $R_4''$ are hydrogen or chlorine.

4. A compound according to claim 1, wherein $R_1$, $R'$, $R_3$, and $R_4$, are hydrogen, and the compound is therefore 2,9-dihydro-3H-dibenzo[c,f]-s-triazolo[4,3-a]azepine-3-one.

5. A compound according to claim 3, wherein $R_3''$ and $R_4''$ are hydrogen, $n$ is 2, $R_7'$ and $R_8'$ are methyl, and the compound is therefore 2-[2-(dimethylamino)ethyl]-2,9-dihydro-3H-dibenzo[c,f]-s-triazolo[4,3-a]azepin-3-one.

6. The hydrochloride of the compound of claim 5.

7. A compound according to claim 3, wherein $n$ is 3, $R_7'$ and $R_8'$ are methyl, $R_3''$ and $R_4''$ are hydrogen, and the compound is therefore 2-[3-(dimethylamino)propyl]-2,9-dihydro-3H-dibenzo[c,f]-s-triazolo[4,3-a]azepin-3-one.

8. A compound according to claim 1, wherein $R_1$ is 3-(4-methyl-1-piperazinyl)propyl, $R'$, $R_3$, and $R_4$ are hydrogen, and the compound is therefore 2,9-dihydro-2-[3-(4-methyl-1-piperazinyl)propyl]-3H-dibenzo[c,f]-s-triazolo[4,3-a]-azepin-3-one.

9. The compound of claim 8 as the dihydrochloric acid addition salt.

10. A compound according to claim 1, wherein $R'$, $R_1$, and $R_3$ are hydrogen, $R_4$ is 7-chloro and the compound is therefore 7-chloro-2,9-dihydro-3H-dibenzo[c,f]-s-triazolo[4,3-a]-azepin-3-one.

11. A compound according to claim 3, wherein $R_3''$ is hydrogen, $n$ is 2, $R_7'$ and $R_8'$ are methyl, $R_4''$ is 7-chloro and the compound is therefore 7-chloro-2-[2-(dimethylamino)ethyl]-2,9-dihydro-3H-dibenzo[c,f]-s-triazolo[4,3-a]azepin-3-one.

12. A compound according to claim 3, wherein $R_3''$ and $R_4''$ are hydrogen, $n$ is 2, $R_7'$ and $R_8'$ are ethyl and the compound is therefore 2-[2-(diethylamino)ethyl]-2,9-dihydro-3H-dibenzo[c,f]-s-triazolo[4,3-a]azepin-3-one.

13. The maleate of the compound of claim 12 as an acid addition salt.

14. A compound according to claim 1, wherein $R_1$ is dimethylaminoethyl, $R_3$ and $R_4$ are hydrogen, $R'$ is methyl and the compound is therefore 9,9-dimethyl-2-[2-(dimethylamino)-ethyl]-2,9-dihydro-3H-dibenzo[c,f]-s-triazolo[4,3-azepin-3-one.

15. A compound according to claim 1 as hydrochloric acid addition salt, wherein $R_1$ is 2-(1-piperidinyl)ethyl, $R'$, $R_3$, and $R_4$ are hydrogen, and the compound is therefore 2,9-dihydro-2-[2-(1-piperidinyl)ethyl]-3H-dibenzo[c,f]-s-triazolo[4,3-a]azepine-3-one hydrochloride.

16. 2,9-Dihydro-2-[(1-methylpiperidine-2-yl)methyl]-3H-dibenzo[c,f]-s-triazolo[4,3-a]azepin-3-one hydrochloride.

17. A compound according to claim 1 wherein $R_1$ is 2-(methylamino)ethyl; $R'$, $R_3$ and $R_4$ are hydrogen and the compound is therefore 2,9-dihydro-2-[2-(methylamino)ethyl]-3H-dibenzo[c,f]-s-triazolo[4,3-a]azepin-3-one.

18. The hydrochloric acid addition salt of the compound of claim 17.

19. A compound according to claim 1 wherein $R'$, $R_1$, and $R_3$ are hydrogen, $R_4$ is 6-chloro and the compound is therefore 6-chloro-2,9-dihydro-3H-dibenzo[c,f]-s-triazolo[4,3-a]-azepin-3-one.

20. A compound according to claim 1 wherein $R_1$ is 2-(dimethylamino)ethyl; $R'$ and $R_3$ are hydrogen, $R_4$ is 6-chloro, and the compound is therefore 6-chloro-2-[2-(dimethylamino)ethyl]-2,9-dihydro-3H-dibenzo[c,f]-s-triazolo[4,3-a]azepin-3-one.

21. 2-[2-(benzylmethylamino)ethyl]-2,9-dihydro-3H-dibenzo[c,f]-s-triazolo[4,3-a]azepine-3-one hydrochloride.

22. A compound according to claim 1 as a maleate wherein $R_1$ is 3-(dimethylamino)propyl, $R_4$ is 6-chloro; $R'$ and $R_3$ are hydrogen, and the compound is therefore 6-chloro-2,9-dihydro-2-[3-(dimethylamino)propyl]-3H-dibenzo[c,f]-s-triazolo[4,3-a]azepin-3-one maleate.

23. A compound according to claim 1 as a dihydrochloride wherein $R_1$ is 2-(4-methyl-1-piperazinyl)ethyl, $R'$, $R_3$, and $R_4$ are hydrogen, and the compound is therefore 2,9-dihydro-2-[2-(4-methyl-1-piperazinyl)ethyl]-3H-dibenzo[c,f]-s-triazolo[4,3-a]azepin-3-one dihydrochloride.

24. A compound according to claim 3, wherein $R_3''$ and $R_4''$ are hydrogen, $n$ is 2, $R_7'$ and $R_8'$ are hydrogen and the compound is therefore 2-[2-(amino)ethyl]-2,9-dihydro-3H-dibenzo[c,f]-s-triazolo[4,3-a]azepin-3-one.

25. The compound of claim 24 as the napsylate salt.

26. A compound according to claim 1 as oxalate wherein $R_1$ is 2-[2-(hydroxylethyl)methylamino]ethyl, $R'$, $R_3$, and $R_4$ are hydrogen, and the compound is therefore 2,9-dihydro-2-[2-[2-(hydroxyethyl)methylamino]ethyl]-3H-dibenzo[c,f]-s-triazolo[4,3-a]azepin-3-one oxalate.

* * * * *

UNITED STATES PATENT OFFICE
CERTIFICATE OF CORRECTION

Patent No. 3,853,882          Dated December 10, 1974

Inventor(s)  Jacob Szmuszkovicz

It is certified that error appears in the above-identified patent and that said Letters Patent are hereby corrected as shown below:

Title, Face Page   "[C,F]-S-" should read -- [c,f]-s- --.
Abstract   "defined as above" should read -- of 1 to 3 carbon atoms, inclusive --.
Abstract   "of one to three carbon atoms, inclusive" should read -- defined as above --.
Column 1, line 1  "[C,F]-S-" should read -- [c,f]-s- --.
Column 4, line 51 "3H-dibenzo-[3H-dibenzo-[c,f]" should read -- 3H-dibenzo-[c,f] --.
Column 4, line 54 "trizolo" should read -- triazolo --.
Column 5, lines 25-26 "6 x 11 x 5 inches" should read -- 6" x 11" x 5" --.
Column 5, line 32 "D showed" should read -- A showed --.
Column 14, line 65 "[4,3a]" should read -- [4,3-a] --.
Column 17, line 27 "4,3a" should read -- 4,3-a --.
Column 19, line 65 "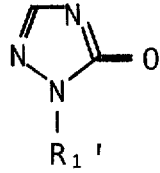" should read -- 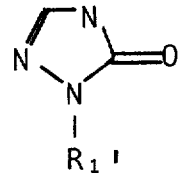 --.

Signed and Sealed this

Twenty-first Day of March 1978

[SEAL]

Attest:

RUTH C. MASON
Attesting Officer

LUTRELLE F. PARKER
Acting Commissioner of Patents and Trademarks